Dec. 3, 1929.   R. E. WAGNER ET AL   1,738,465
LINE WELDING
Filed Jan. 19, 1922   3 Sheets-Sheet 1

Inventors.
Robert E. Wagner,
Wesley E. Laird,
by Albert G. Davis
Their Attorney.

Dec. 3, 1929.  R. E. WAGNER ET AL  1,738,465
LINE WELDING
Filed Jan. 19, 1922   3 Sheets-Sheet 2
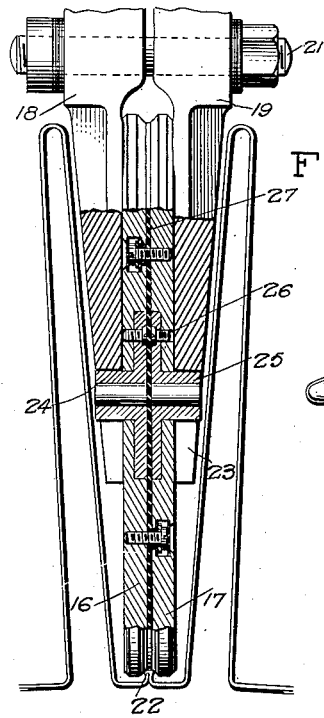
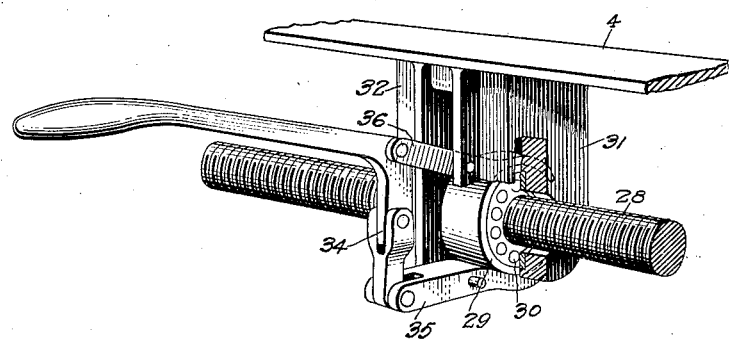
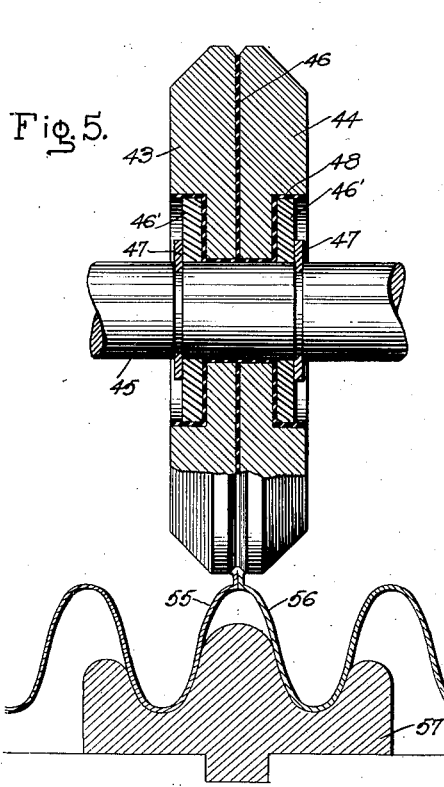
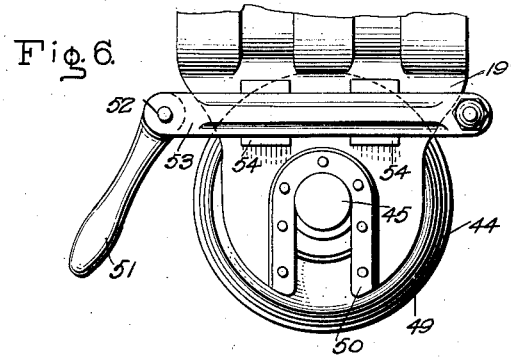
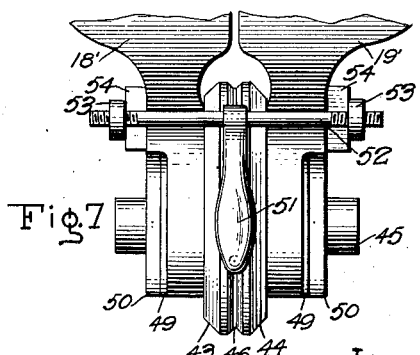
Inventor
Robert E. Wagner,
Wesley E. Laird,
by
Their Attorney.

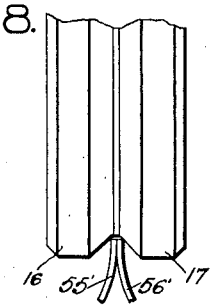
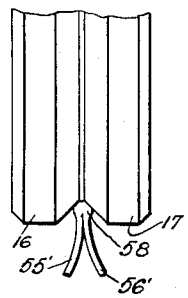
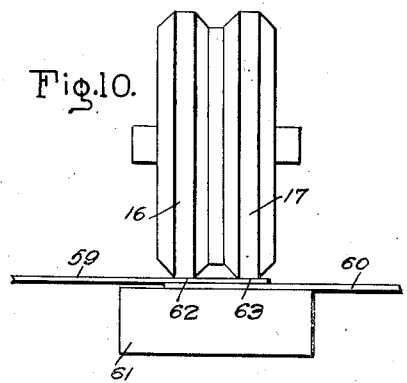
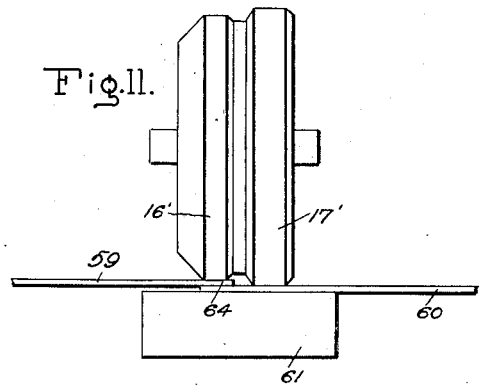
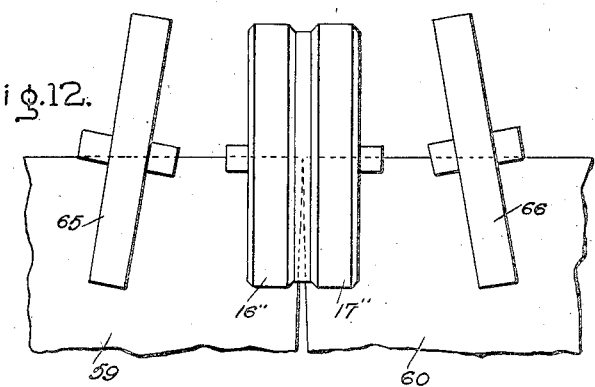

Patented Dec. 3, 1929

1,738,465

UNITED STATES PATENT OFFICE

ROBERT E. WAGNER AND WESLEY E. LAIRD, OF PITTSFIELD, MASSACHUSETTS, ASSIGNORS TO GENERAL ELECTRIC COMPANY, A CORPORATION OF NEW YORK

LINE WELDING

Application filed January 19, 1922. Serial No. 530,434.

Our invention relates to electric welding and more particularly to resistance welding of the type wherein two or more articles, for example, sheets or plates, are welded together in a line or seam and wherein the heat for bringing the articles to a welding temperature in the line of the weld is developed in the articles to be welded by passing an electric current therethrough.

An object of our invention is to provide an apparatus and method of operation which shall so determine the path of flow of the welding current as equally to heat the articles to be welded and develop the heat at the exact point where welding is taking place thereby securing efficient and rapid operation. A further object of our invention is to enable a strong, tight joint to be made without danger of burning through the work in the line of the seam. A further object of our invention is to provide an apparatus which shall be simple to operate, rugged in construction and capable of making several types of line weld.

Our invention will be better understood from the following description taken in connection with the accompanying drawings and its scope will be pointed out in the appended claims.

Figure 1:
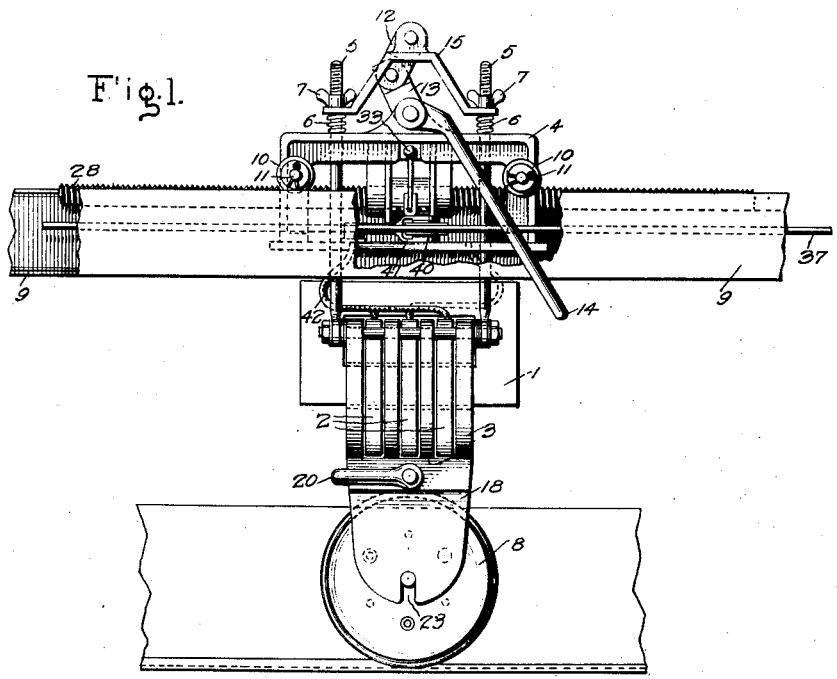
Figure 2:
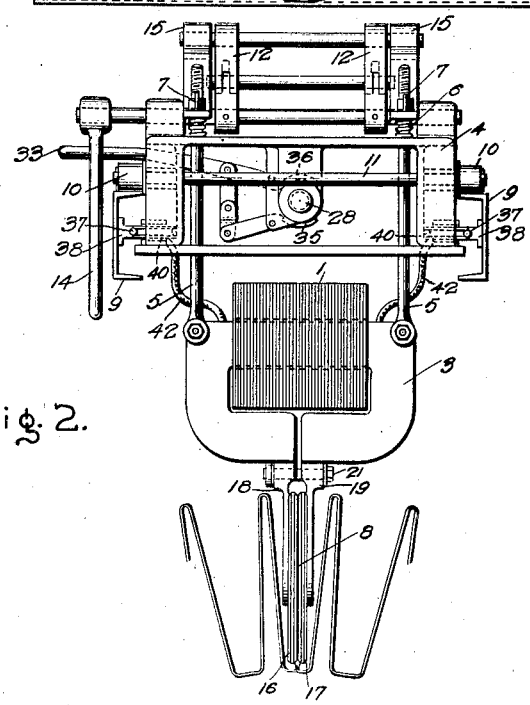

In the accompanying drawings Fig. 1 is a side view of an apparatus embodying our invention, certain parts being broken so as to show the construction more clearly; Fig. 2 is an end view of the apparatus shown in Fig. 1; Fig. 3 is a partly sectional view showing the preferred construction of the welding wheel; Figs. 1, 2 and 3 also show how the welding wheel may be arranged to weld deeply corrugated sheets or plates; Fig. 4 is a detail view showing lever mechanism for controlling the driving relationship between the feed screw and the welding head; Fig. 5 shows a modified construction of welding wheel anl also shows a modified arrangement for welding corrugated sheets together; Fig. 6 is a fragmentary side view showing how the welding wheel of Fig. 5 may be secured to the welding transformer; Fig. 7 is an end view of the parts shown in Fig. 6; Figs. 8 and 9 are fragmentary views illustrating the principle of operation of the welding wheel; Fig. 10 shows how the welding wheel may be used for making a double line weld; Fig. 11 shows a modified construction of welding wheel for making a single line lap weld; Fig. 12 shows how the welding wheel may be arranged to make a butt line weld.

Referring to Figs. 1 and 2 the welding transformer, comprising a core 1, primary windings 2 and single turn secondaries 3, is adjustably supported under carriage 4 by four rods 5 provided with springs 6 arranged to bear against the top of the carriage 4. The rods 5 are free to slide in holes in the top and bottom frame members of the carriage so that a portion of the weight of the transformer may be carried on the springs 6. By adjusting wing nuts 7 on the bolts 5 the pressure applied to the welding wheel may be adjusted to the desired amount. The carriage 4 is supported on channels 9 by flanged wheels 10 which are mounted on shafts 11. The channels 9 may be supported at their ends by any suitable frame work and these channels should be longer than the seam to be welded so that the welding wheel, when at either end of the weld, will allow the work to be readily removed or advanced for the purpose of making a second line weld. For raising the transformer and welding wheel from the work a toggle comprising a pair of links 12 and 13 and an operating lever 14 is arranged to cooperate with a pair of yokes 15 secured between the springs 6 and wing nuts 7. When the toggle is straightened the transformer and welding wheel are lifted from the work, the total weight of the apparatus then being supported on the channels 9. When the toggle is broken the transformer is lowered and the amount of pressure that is transferred to the welding wheel is governed by the adjustment of the wing nuts 7.

According to our invention a divided welding wheel is used the preferred construction of which is shown more clearly in Fig. 3. This welding wheel comprises two copper disc electrodes 16 and 17 carefully insulated from each other. The welding elec'rodes are carried by and are respectively in electrical contact with the ends of the secondaries 3 of the transformer. The corresponding ends of these secondaries lead to and are connected together by terminal members 18 and 19 which are arranged to be clamped respectively against the faces of the electrodes 16 and 17. Since a large contact area is provided between the electrodes and terminal members a very strong clamping action is unnecessary. Since the movement required for sufficient clamping is slight this movement is readily provided by the resiliency of the single turn secondaries 3. To secure the clamping action a suitable clamping lever 20 is provided which lever is arranged to cooperate with an insulated bolt 21. The edges of the opposed faces of the welding electrodes are beveled or inclined to provide a substantially V shaped circumferential groove in the welding wheel and, where the edges of the work are upturned as shown at 22, a heavy welding current may pass from one side of the welding wheel through the upturned edges of the sheets to be welded to the opposite side of the welding wheel. The divided construction of the welding wheel is particularly adapted to the method of clamping the wheel in place. If electrodes supported on independent bearings were used it would be necessary not only to provide stationary bearings for the respective electrodes but it would also be necessary to arrange such bearings so as to prevent the electrodes from coming into contact with each other. The members 18 and 19 are notched as shown at 23, Fig. 1, to provide bearings for the shaft of the welding wheel. In the modification here shown a divided axle 24, 25 is provided and each shaft division or stub shaft is provided with a head secured to the respective wheel division by screws 26. These heads are inserted in depressions in the electrodes 16 and 17 and suitable insulating material such as a thin plate of lava 27 is provided to insulate the divisions of the electrode wheel from each other. To remove the welding wheel, as for example, where it is desired to insert a new welding wheel, it is merely necessary to loosen the clamping lever 20 and raise the welding transformer by the lever 14, thus allowing the welding wheel to drop out of the slots 23. The beveled arrangement of the electrodes whereby the welding wheel has a V shaped circumferential groove is peculiarly adapted to produce a good weld as will be hereinafter more fully set forth.

In the embodiment of our invention here disclosed the work is stationary and the welding wheel is arranged to move along the line of the seam to be welded. It is apparent, however, that our invention is not limited to this arrangement since if desired the welding head may be stationary and the work moved. In order to move the electrode over the work we provide a threaded shaft 28. Any suitable means, for example, an adjustable speed motor, may be provided for driving the shaft 28 and any suitable means may be provided for clutching the carriage to the shaft to cause the carriage to travel or remain stationary as desired. As shown more clearly in Fig. 4 we preferably provide a nut 29 provided with ball thrust bearings 30 on each side arranged to bear against projections 31 and 32 from the frame of the carriage 4. A lever 33 is arranged by means of a toggle 34 to operate clamping members 35 and 36 pivoted in the members 31 and 32. When the lever 33 is moved to straighten the toggle 34, nut 29 is held against rotation and the carriage is moved along the line of the weld in accordance with the direction of rotation of shaft 28. To stop this motion of the carriage it is merely necessary to operate the lever 33 to break the toggle 34 and free the nut 29. When the carriage has been operated to the desired extent in one direction the shaft 28 may be reversed to move the carriage in the other direction and welding may be performed with either direction of the movement.

In order to lead the welding current into the movable transformer we preferably provide a pair of trolley wires or the like 37 suitably supported on the channels 9 by insulators 38. Trolley wheels 40 mounted in arms 41 pivoted on the carriage 4 are spring pressed against trolley wires 37. Suitable leads 42 connect the trolley wheels with the primary windings 2 of the transformer.

In the arrangement shown in Figs. 1, 2 and 3, the welding wheel is arranged to weld together deeply corrugated sheets which may, for example, be used to build up transformer tanks and the like, the corrugations being utilized for cooling purposes. The compact arrangement of parts makes it possible to weld down in between corrugations that are quite close together. Moreover since the sides of the welding circuit comprising the welding electrodes are very close together the reactance of the secondary circuit may be reduced to a very low value, thereby improving the power factor and efficiency of the apparatus.

Figs. 5, 6 and 7 show a modified construction of welding wheel and method of mounting the same which may be used. The welding wheel here shown comprises copper disc electrodes 43 and 44 mounted on a shaft 45 supported in the members 18' and 19' which are connected to the transformer secondaries in the same manner that the corresponding members 18 and 19 are connected in the modifications heretofore described. The electrodes 43 and 44 are insulated from each other by a lava disc 46 and are held in place by clamping collars 46' which are in turn held in place by split washers 47. The electrodes 43 and 44 are insulated from the shaft 45 and from the washers 46 by suitable insulation 48 such as mica. Since the shaft 45 is in this case in one piece it must be insulated from the transformer terminal members 18' and 19'. This insulation may be provided by insulation 49 under the bearing linings 50 secured to the members 18' and 19'.

Figs. 6 and 7 also show a modified arrangement for clamping the transformer terminals against the sides of the welding wheel. This clamping arrangement comprises a lever 51 arranged to operate a shaft 52 the ends of which are oppositely threaded. Rotation of the shaft 52 causes clamping bars 53 to engage suitable insulated pads 54 on the terminal members 18' and 19' and clamp the terminal members against the welding wheel.

The welding wheel is shown in Fig. 5 as arranged to weld together corrugated members 55 and 56 which are supported in a guide member 57 grooved to fit the corrugations in the sheets to be welded. The downward pressure of the welding wheel causes the V shaped groove to engage the edges of the sheets to be welded and crowd them together. The same action takes place with the arrangement shown in Figs. 1, 2 and 3 and it is obvious that the welding wheel shown in Fig. 3 may be used to weld the corrugations in the manner shown in Fig. 5 if desired.

The general operation of our invention is believed to be obvious from the preceding description but certain advantageous effects are incident to the use of our type of welding wheel in making line welds in the manner described. Line welding is greatly simplified and cheapened for the reason that it is wholly unnecessary to clean the edges of the stock to be welded as is necessary with all line welding machines heretofore proposed with which we are familiar. Line welding is thus made as cheap, as far as cleaning the stock is concerned, as ordinary arc welding. The weld made by our apparatus is exceptionally strong since there is an upsetting of the work which corresponds generally to the upsetting produced by the butt-welding of two pieces of metal in the well known Thomson process. This upsetting action will be apparent from Figs. 8 and 9. Fig. 8 represents the condition that would obtain if the welding wheel were placed on the stock without closing the welding circuit. The upturned edges of the stock are indicated at 55' 56'. The edge portions lie substantially side by side and extend in substantially the same direction. The sheets to be welded might be flat against one another if an edge weld of such character were desired. The edges of the stock lie substantially in alinement or flush with each other and the inclined contact surfaces of the welding wheel engage the outside corners of the upturned edges. Upon the passage of welding current from one side of the wheel to the other the welding wheel sinks further into the edges of the welded sheets by reason of the softening of the metal and the weight of the transformer. The softening metal is thus forced out or upset to form a bead, the weld being of the section shown at 58 in Fig. 9. An automatic control of the density of the welding current per square inch of stock takes place, which control prevents burning of the stock. This automatic control takes place by reason of the fact that the area of contact between the electrodes and the stock rapidly increases as the welding wheel sinks into the stock. If the wheel is advanced at a uniform speed the depth of the weld will be uniform, if the rate of travel is decreased or the voltage at the primary circuit increased, the wheel will sink further into the edges of the welded sheets giving a greater area of contact and keeping the welding current from blowing a hole in the work. If a hard spot is encountered in the work, the wheel rises decreasing the area of contact and concentrating the welding current on a smaller portion of the seam. As the metal softens the weight of the transformer forces the wheel down welding the edges of the seam and causing increased area of contact until the welded metal will not yield further to the pressure. In operation these effects take place so rapidly that the wheel is not raised or lowered appreciably and a smooth uniform weld results. The V shaped groove in the welding wheel not only crowds the sheets to be welded together making it unnecessary to provide special clamping means to clamp the sheets together prior to welding, but also confines and compacts and thereby to a certain extent forges the metal of the weld. The welding current is, moreover, confined to a very small part of the work and the heating effect is, therefore, very concentrated so that the metal to be welded is quickly and efficiently brought to a welding temperature. The construction of the apparatus, moreover, insures that the same welding current shall flow through both of the sheets to be welded. If a single electrode were used to lead current into the joint to be welded, the current might divide unequally in the sheet, even though the welding wheel were provided with a V shaped groove, since one of the sheets might project beyond the other and carry most of the current. This effect does not take place with our invention.

While we prefer to arrange the apparatus so that pressure is applied to the welding wheel by the weight of the transformer in the manner hertofore set forth, it will be obvious to those skilled in the art that pressure between the welding wheel and work may be produced in other ways and that it is broadly immaterial as far as the action of the welding wheel is concerned whether the wheel is pressed against the work or the work against the wheel.

While our divided construction of electrode wheel is particularly adapted to make welds of the type heretofore described the welding wheel may also be used to make line welds of a different type where desired. Figs. 10, 11 and 12 show various ways in which the divided welding wheel may be used to produce various types of weld.

Fig. 10 shows the electrode wheel arranged to make a double line lap weld. The two plates to be joined are shown at 59 and 60. The plates are compressed between the electrode wheel and conducting support 61 preferably of copper, extending along the line of the joint. Welding current flows in series through the two welds at 62 and 63.

Fig. 11 shows a modification in which a single line lap weld 64 is made between the plates 59 and 60. The electrode wheel division 17' is made with a contact face considerably wider than the contact face of the electrode division 16' so that there is no tendency to raise the plate 60 under 17' to a welding temperature.

Fig. 12 shows the electrode wheel arranged to produce a butt weld between the plates 59 and 60. The electrode divisions 16'' and 17'' are provided with comparatively wide contact faces so that most of the heat is developed at the abutting edges of the plates. In butt welding it is usually desirable to press the edges of the sheets together at the starting point of the weld, separating the edges at the opposite end of the seam a small amount. As the welding progresses, the sheets are pressed together by some mechanical means assisted by the contraction of the weld, until at the end of the seam the edges have been drawn together and a perfect seam made.

In Fig. 12 we have shown two pressure wheels 65 and 66 which have their axes at an angle with the seam and line of travel of the wheel. These pressure wheels are arranged to travel with the welding wheel and serve to press the edges of the sheets together as the welding progresses.

It will be obvious to those skilled in the art that in its broader aspects our invention is not limited to the exact structural arrangements shown and described and we therefore aim to cover in the appended claims all such modifications and variations as fall within the spirit of our invention.

What we claim as new and desire to secure by Letters Patent of the United States, is:

1. The method of resistance line welding which comprises arranging the edge portions of the sheets to be welded so that they extend in substantially the same direction and lie substantially side by side with their edges substantially flush with each other, and applying welding current and pressure to the outside corners of the upturned edges of the sheets along planes inclined to the plane of the meeting edge portions of the sheets.

2. The method of resistance line welding sheets having upturned edges arranged substantially flush with each other, which comprises applying welding current and pressure against the outside corners of the upturned edges.

3. The method of resistance line welding articles having edge joints lying side by side and substantially flush, which comprises applying welding current and pressure to the outside corners of the upturned edges of the edge portions along planes inclined to the plane of the joint to be yielded to upset and forge the metal of the joint, and regulating the density of the welding current according to the upset to prevent burning of the metal.

4. The method of resistance welding articles having edge portions lying side by side and in substantial alinement which consists in applying current and pressure to the outside corners of the edge portions and in forging the welding joint into a bead formation by said pressure on the edge portions.

5. A welding machine of the class described comprising a pair of adjacent relatively movable conducting terminal members arranged to be connected to a source of welding current, a welding wheel comprising a pair of electrodes insulated from each other arranged between said terminal members, and means for clamping said terminal members against the sides of said welding wheel, said terminal members being arranged to provide bearings for said wheel and arranged to provide a large area of contact with the sides of said electrodes whereby good electrical engagement may be secured with a clamping pressure sufficiently light to permit said wheel to rotate readily.

6. A welding machine of the class described comprising a transformer, means for supporting said transformer to permit self-adjusting relative movement between the work and said transformer during the welding operation, a pair of adjacent conducting terminal members rigidly secured to the respective terminals of the transformer secondary, said secondary being constructed and arranged to be sufficiently resilient to permit a slight movement of said terminal members toward and from each other, a welding wheel comprising a pair of disc electrodes insulated from each other and mounted between said terminal members and means for clamping said terminal members against the sides of said welding wheel, said terminal members being provided with slots to furnish bearings for said welding wheel and permit the ready removal thereof and arranged to provide a large area of contact with the sides of said electrodes.

7. A welding machine of the class described comprising a welding wheel consisting of a pair of disc electrodes secured together and insulated from each other, the adjacent edges of said electrodes being inclined to provide a circumferential groove in the welding wheel, and a transformer provided with terminal members in electrical and mechanical engagement with the sides of said welding wheel to supply welding current to said electrodes, said terminal members being arranged to provide bearings for said welding wheel whereby the weight of said transformer may be utilized to force the welding wheel against the work.

8. A welding machine of the class described for welding the upturned edges of sheet or similar work comprising a transformer provided with resilient secondary terminal members, a welding wheel mounted to rotate between said terminal members, said wheel comprising a pair of disc electrodes insulated from each other, means for clamping said terminal members against the sides of said wheel, the edges of the adjacent faces of said electrodes being beveled to provide a circumferential groove in said welding wheel adapted to make contact with and crowd together the edges of the articles to be welded, and means for resiliently supporting the transformer whereby the position of the transformer may vary to change the area of contact between the welding wheel and the edges of the work and whereby the weight of the transformer may be utilized to force the welding wheel against the work.

9. A welding machine of the class described comprising a welding wheel including a pair of electrodes insulated from one another and provided with stub shafts, a pair of conducting terminal members having slots arranged to form bearings for said shafts, and means for clamping said terminal members against the sides of said wheel whereby good electrical contact is secured between said terminal members and the sides of said wheel with a clamping pressure sufficiently light to permit said wheel to rotate readily.

10. A welding machine of the class described comprising a welding wheel, a transformer including secondary terminals slotted to form bearings for said wheel and arranged to engage the sides of said wheel for transmitting current thereto, and means for adjusting the pressure exerted on said bearings by the weight of said transformer.

11. In a line welding machine for welding the upturned edges of sheets or similar work, a welding wheel comprising a pair of disk electrodes insulated from each other, the edges of the adjacent surfaces of said electrodes being beveled to provide a circumferential groove in said welding wheel adapted to make contact with and crowd together the edges of the article to be welded, and means for resiliently supporting the welding wheel relatively to the work whereby the position of the welding wheel and the work may vary to change the area of contact between the welding wheel and the edges of the work.

In witness whereof, we have hereunto set our hands this 17th day of January, 1922.
ROBERT E. WAGNER.
WESLEY E. LAIRD.

CERTIFICATE OF CORRECTION.

Patent No. 1,738,465.  Granted December 3, 1929, to

ROBERT E. WAGNER ET AL.

It is hereby certified that error appears in the printed specification of the above numbered patent requiring correction as follows: Page 4, line 80, claim 3, for the word "yielded" read "welded"; page 5, line 16, claim 8, for "sheet" read "sheets"; and that the said Letters Patent should be read with these corrections therein that the same may conform to the record of the case in the Patent Office.

Signed and sealed this 7th day of January, A. D. 1930.

(Seal)

M. J. Moore,
Acting Commissioner of Patents.